United States Patent [19]

Lewinter et al.

[11] Patent Number: 4,767,027

[45] Date of Patent: Aug. 30, 1988

[54] MULTI-FUNCTION SPOUT

[76] Inventors: Orest Lewinter; Barbara Lewinter, both of 104 Homestead Ave., Albany, N.Y. 12203

[21] Appl. No.: 935,527

[22] Filed: Nov. 26, 1986

Related U.S. Application Data

[63] Continuation-in-part of Ser. No. 859,416, May 5, 1986, abandoned.

[51] Int. Cl.4 .................. B65B 39/06; G01F 19/00
[52] U.S. Cl. .................................... 222/158; 73/427; 141/364; 220/85 SP; 222/166; 222/536
[58] Field of Search ............... 222/154, 158, 164–166, 222/526, 533, 536, 538, 454, 456, 23; 141/98, 106, 284, 364–366, 384, 386; 220/85 SP; 73/426, 427

[56] References Cited

U.S. PATENT DOCUMENTS

| | | | |
|---|---|---|---|
| 508,730 | 11/1893 | Lynn | 222/536 |
| 2,883,091 | 4/1959 | Barravecchia | 222/536 X |
| 2,916,190 | 12/1959 | Furn | 222/536 X |
| 2,990,980 | 7/1961 | Gronemeyer | 222/536 |
| 3,527,269 | 9/1970 | Wilton | 222/166 X |
| 3,948,105 | 4/1976 | Johnson, Jr. | 73/427 |
| 4,015,756 | 4/1977 | Beck | 222/536 X |
| 4,135,404 | 1/1979 | Butler, Jr. | 222/158 X |
| 4,140,160 | 2/1979 | Glackin | 141/364 X |
| 4,292,846 | 10/1981 | Barnett | 73/427 |
| 4,509,659 | 4/1985 | Cloutier et al. | 222/444 X |

FOREIGN PATENT DOCUMENTS 704005 4/1966 Italy ............................ 222/526

Primary Examiner—Kevin P. Shaver

[57] ABSTRACT

A multi-functional pouring spout for use on a container has a hollow tubular member pivotally mounted on a pair of brackets attached to a cap. The tubular member has a vertical position in which the lower end of the member is closed by the cap such that it functions as a measuring vessel. The member also has a tilted position in which the lower end communicates with the interior of the container through a hole in the cap to permit fluid in the member to be transferred into the container and to permit fluid to be poured from the container through the tubular member. The vertical position also causes an integral cover to close the hole in the cap.

4 Claims, 2 Drawing Sheets

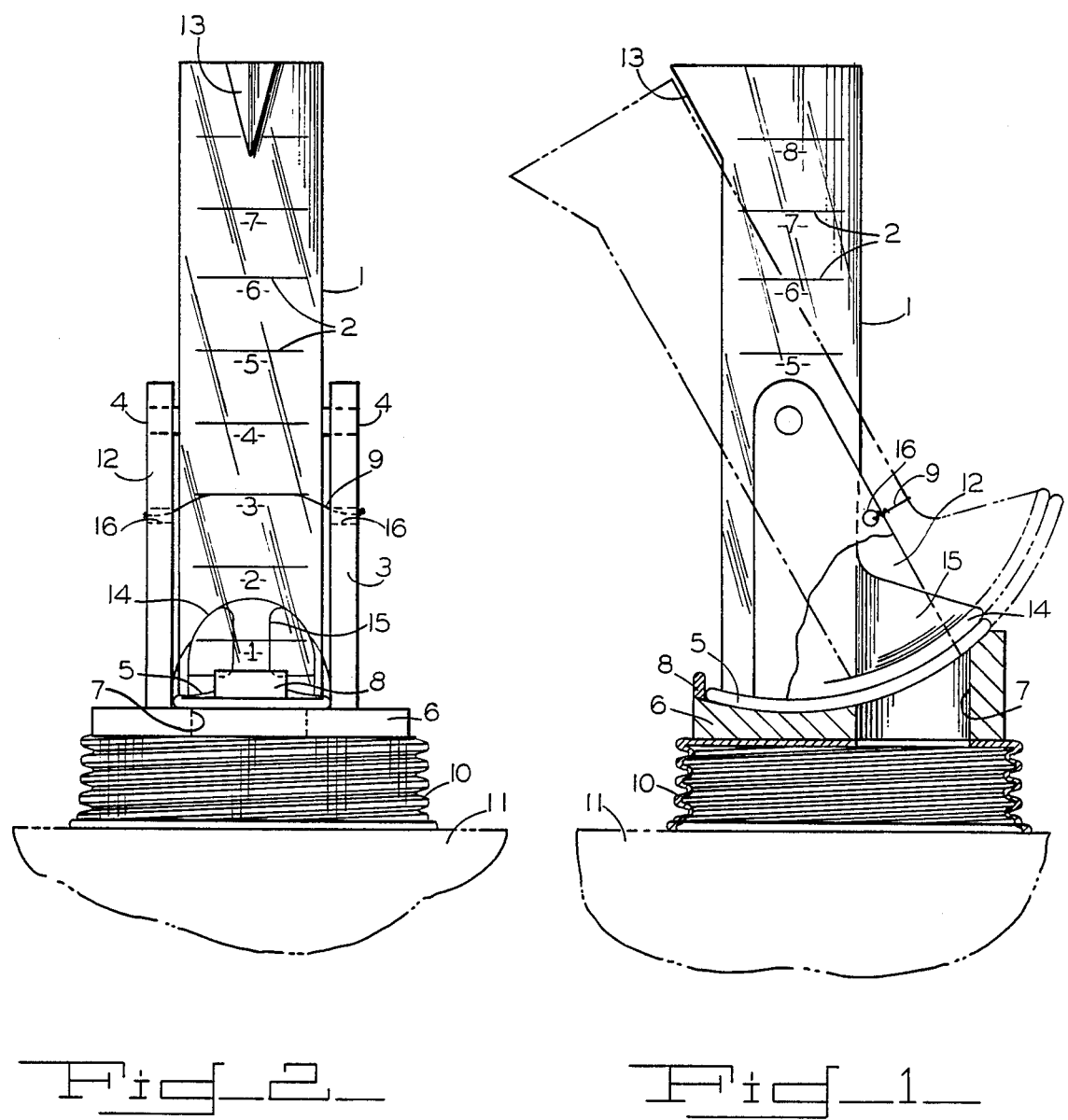

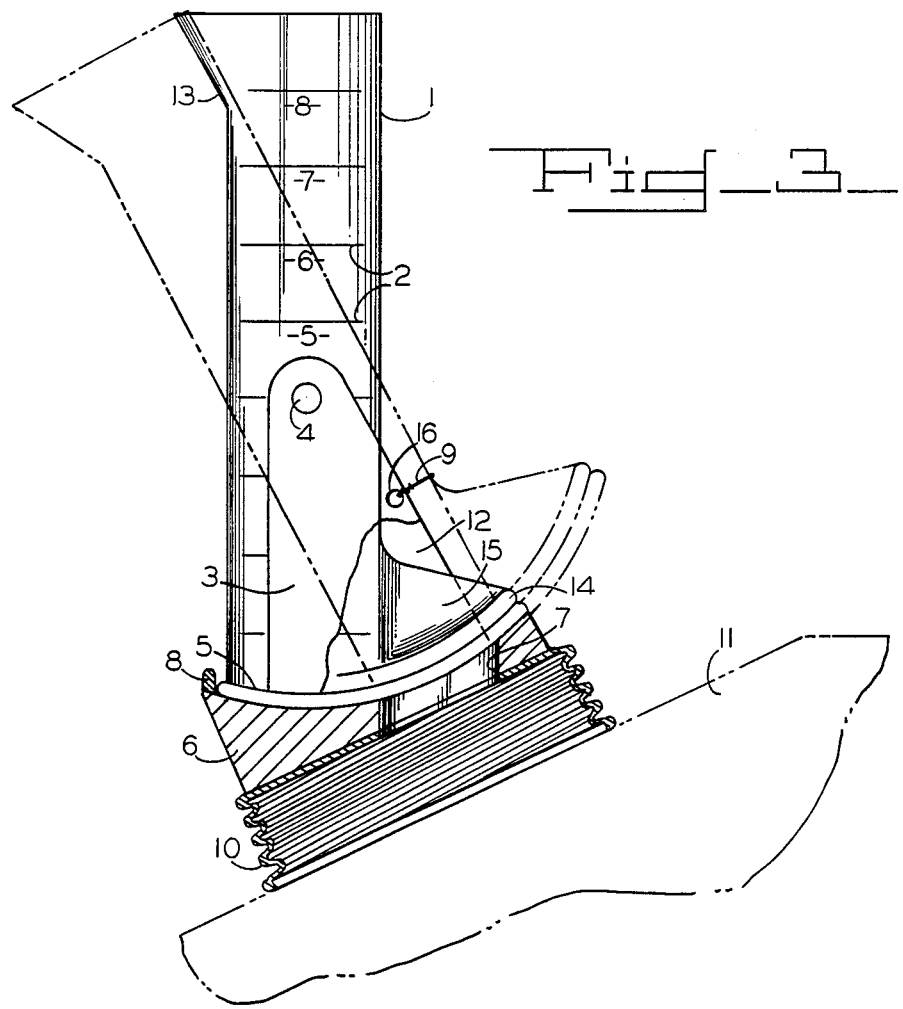
Fig_3
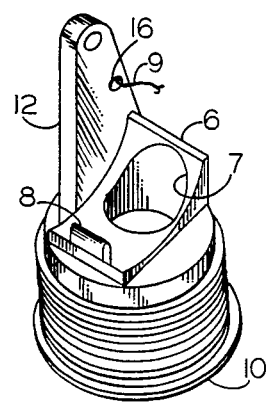
Fig_4
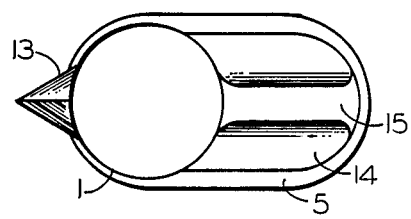
Fig_5

MULTI-FUNCTION SPOUT

This application is a continuation-in-part of Ser. No. 859,416 filed May 5, 1986, now abandoned.

BACKGROUND AND SUMMARY OF INVENTION

This invention is a pouring spout which performs functions in addition to the typical one of pouring fluid(s) out from the container which is attached to it.

One additional function is the ability of the spout to open or close the container to allow filling (optional feature), dispensing, or storage of the fluid(s). This eliminates the need for a separate closure for the container or for the spout, thereby lowering costs. Furthermore, the simple swivel movement of the spout speeds the opening and closing operation and eliminates the possibility of loss or misplacement of a separate closing cap.

Another function of this invention is its ability to measure the volume of a fluid prior to dispensing of that fluid into the container. One application of this function would be the measurement of the quantity of two-cycle oil needed to be mixed with gasoline for two-cycle engines. A number of devices on the market incorporate two-cycle engines. These require various ratios of two-cycle oil to gasoline. The devices include lawn mowers and edgers, grass or hedge trimmers, chain saws, snow blowers, outboard motors, etc. The process of measuring and mixing the two-cycle oil with gasoline is presently a rather messy operation which requires the purchase and the cleaning of a separate measuring container. This extra expense and cleaning operation would be eliminated by the present invention.

In addition, the multifunctional pouring spout could be optionally designed to allow direct filling through it to the container with a nozzle such as that used at gasoline filling stations. This would obviate the need for a separate screw-on filling cap for the container.

A further purpose of the present invention is to perform the above functions with a relatively simple and inexpensive device. In addition (in the case of gasoline cans) because there are only several standard sizes of container caps (and threaded necks to which the device could be attached instead of the caps), the device could be easily mass produced and either sold separately as an optional attachment or sold together with the gasoline can.

The prior art includes one or two of the above functions, but not all three. For example, U.S. Pat. No. 4,426,027 presents a typical pouring spout (with a detachable cap) which is simply useful for pouring the contents out of a container. U.S. Pat. No. 4,227,629 is a device for closing and opening a container. U.S. Pat. No. 4,474,312 measures and dispenses fluid which is removed from a squeeze-type container, rather than fluid which is poured into its container. Two rather complicated measuring and dispensing devices are U.S. Pat. Nos. 4,429,809 and 4,509,659. Another device (U.S. Pat. No. 4,135,404) is intended to be placed right at the intake of a two-cycle engine fuel tank for the purpose of dispensing two-cycle oil into the tank. This has limited applicability, since any fuel which is already in the tank would make accurate measurement of the remaining oil/gasoline ratio difficult. The present invention eliminates that difficulty by placing the device on the fuel container. Other prior art which may be of some interest are U.S. Pat. Nos. 508,730; 2,883,091; 2,916,190; 4,015,756; 4,323,179; 4,372,344; 4,449,551; 4,463,882; 4,475,572; 4,502,507; 4,505,301; 4,530,375; 4,538,632; and 4,543,996.

BRIEF DESCRIPTION OF THE DRAWINGS

The advantages of the invention will become more apparent from the following detailed description, associated with the drawings, in which:

FIG. 1 is a side elevation in partial cross section of the preferred embodiment on a container with a horizontally flat top surface;

FIG. 2 is a front elevation of the FIG. 1 embodiment;

FIG. 3 is an alternate preferred embodiment for mounting other than on a horizontally flat top surface;

FIG. 4 is a perspective view of the FIG. 1 embodiment, which omits a portion of the FIG. 1 emobodiment for enhanced clarity;

FIG. 5 is a plan view of the central portion of the preferred embodiment.

DETAILED DESCRIPTION OF EMBODIMENTS

The same or similar elements which appear in FIGS. 1 to 5 will be identified by the same numbers. Although all Figures depict the preferred embodiment, some (but not all) possible variations of that embodiment will be noted.

The threaded closure cap 10 screws onto the neck of a container 11. A plug 6, which is composed of a material to allow a sealing fit into cap 10 and the neck of the container 11, incorporates a hole 7. The plug may be rotatable within the cap prior to affixing the cap onto the container, to permit proper alignment of the spout assembly.

A measuring vessel 1 (a translucent, cylindrically-shaped container) is attached to pivotal means 4 which can rotate on brackets 3 and 12. The drawings showing the measuring vessel may not accurately depict its required size and strength, which must optionally (if fluid filling is a desired function) be sufficient to allow the insertion of a filling nozzle, such as the type used at gasoline filling stations. Alternatively, a separate hole and cap may be placed on the container for the purpose of filling and/or (if necessary) venting to facilitate outpouring, etc. The top of the measuring vessel can be shaped into an optional lip 13 to facilitate pouring of fluid. The bottom of the measuring vessel is curved, open, and incorporates both a hole cover 14 and a washer-type seal 5 to prevent leakage of fluid between the measuring vessel 1 and the plug 6 and to seal the hole 7 during storage of the fluid. A rib 15 is provided on the hole cover 14 for rigidity. Indicia 2 are placed on the measuring vessel in units and intervals which are appropriate for the measurement of the desired fluid.

FIGS. 1 and 3 show two embodiments wherein the measuring vessel 1 is both in the closed or measuring position (solid lines) and in the open, dispensing position (hatched lines). For clarity, FIGS. 1 and 3 depict seal 5 and hole cover 14 only in the closed or measuring position. In practice, the measuring vessel could be in the closed position when not in use and in the open position when it is desired to pour fluid into or out of the container 11. If it is desired to measure and mix one fluid (such as two-cycle oil) with another (such as gasoline), the measuring vessel would be placed in the closed position and the oil (as an example) would be poured therein to the required level, as measured by the indicia 2. Then the measuring vessel would be rotated so that its open bottom is at least partially above the hole 7. The fluid would then pour into the container 11, to be mixed with the second fluid. In addition to its use for measurement of a second fluid, the closed position would be useful to afford container closure during storage of the contents. Lower stop 8 (located on plug 6) and upper stop 9 (located between and connecting brackets 3 and 12) are intended to prevent the pivoting of the measuring vessel away from the plug. Upper stop 9 is a wire which is connected to holes 16 located in brackets 3 and 12. The wire should be coated to prevent abrasion of the measuring vessel.

FIG. 3 is an alternate embodiment which is distinguished from FIG. 1 only with respect to the shape of the plug 6. That plug is shaped (for containers other than those with a horizontal flat top) to permit the measuring vessel 1 to be in a vertical position while fluid is being measured therein.

It may alternatively be possible to design plug 6 with sufficient sealing ability to obviate the need for seal 5. However, the sealing friction between the measuring vessel and plug must not unduly restrict the ability to move the vessel across the top surface of the plug. In addition, although the hole cover 14 is depicted in the preferred embodiments as part of the measuring vessel, it may be separately affixed if that facilitates manufacture and/or reduces cost while maintaining quality. Alternatively, seal 5 and hole cover 14 could be manufactured as one piece to perform the sealing functions. Further, although the pivotal means 4 are shown to be factory-installed, they could be designed (as wingnuts, bolts, etc.) to allow the user to tighten, loosen, adjust, or remove the assembly. Tightening or removing the assembly could be beneficial if the seal 5 were to become worn with use. Tightening could be accomplished if brackets 3 and 12 incorporate slots rather than round holes to receive pivotal means 4. Removal of the assembly could facilitate replacement of an overly worn seal. Alternatively, the seal could be services if upper stop 9 were designed to be removable, since the measuring vessel could then be swiveled up to expose the seal. Furthermore, means other than rib 15 could provide the required rigidity to hole cover 14, depending on the type of material used. In addition, upper stop 9 could be a strap rather than a wire. Further, brackets 3 and 12 and upper stop 9 could be manufactured as one piece.

While the present invention has been described in association with particular preferred embodiments, those skilled in the art will appreciate that such embodiments are susceptible to changes and substitutions of equivalents without departing from the scope of the present invention. In addition to the previously stated examples of possible variations, some further possible variations follow. The measuring vessel can be other than cylindrically shaped (i.e. square, rectangular, or other cross section). It can be made of other than a translucent material, with only the indicia portion being translucent. The hole cover can be replaced with a cover at the top of the measuring vessel. Therefore, the invention disclosed herein is intended to be defined in the following claims.

What is claimed is:

1. A device for measuring fluid to be transferred into a container, for pouring fluid from the container, and for opening and closing the container, said device comprising:
    (A) a hollow transparent tubular member having an upper pouring end and a lower end, said tubular member having a substantially vertical measuring position and a tilted pouring position;
    (B) a cap having means thereon for attachment to a container;
    (C) a plug on said cap, said plug having a curved upper surface and a hole therein for communication with the interior of the container;
    (D) a pair of brackets attached to said device, said brackets having means thereon for pivotally mounting said tubular member thereto;
    (E) cover means for closing said hole, said cover means being integral with and located adjacent to the lower end of said tubular member; and
    (F) indicia means on said tubular member for indicating the amount of fluid therein when in said measuring position;
    whereby, (a) when said tubular member is in said measuring position, the lower end is closed by said curved upper surface of said plug such that the tubular member serves as a measuring vessel, and said cover means closes said hole, and (b) when said tubular member is in said pouring position, the lower end is in fluid communication with said hole to allow fluid to be transferred from the tubular member to the container, and to allow fluid to be poured from the container through the tubular member.

2. A device according to claim 1, further comprising: a seal between said plug and said tubular member to prevent fluid from leaking from the lower end of the tubular member when in the measuring position.

3. A device according to claim 1, further comprising: first and second stop means for limiting the pivotal movement of said tubular member, said first stop means being located on said plug and said second stop means being located between said brackets.

4. A device according to claim 1, further comprising: a seal between said plug and said cover means to prevent fluid from leaking from the hole of said plug when the tubular member is in the measuring position.

* * * * *